Patented Dec. 5, 1950

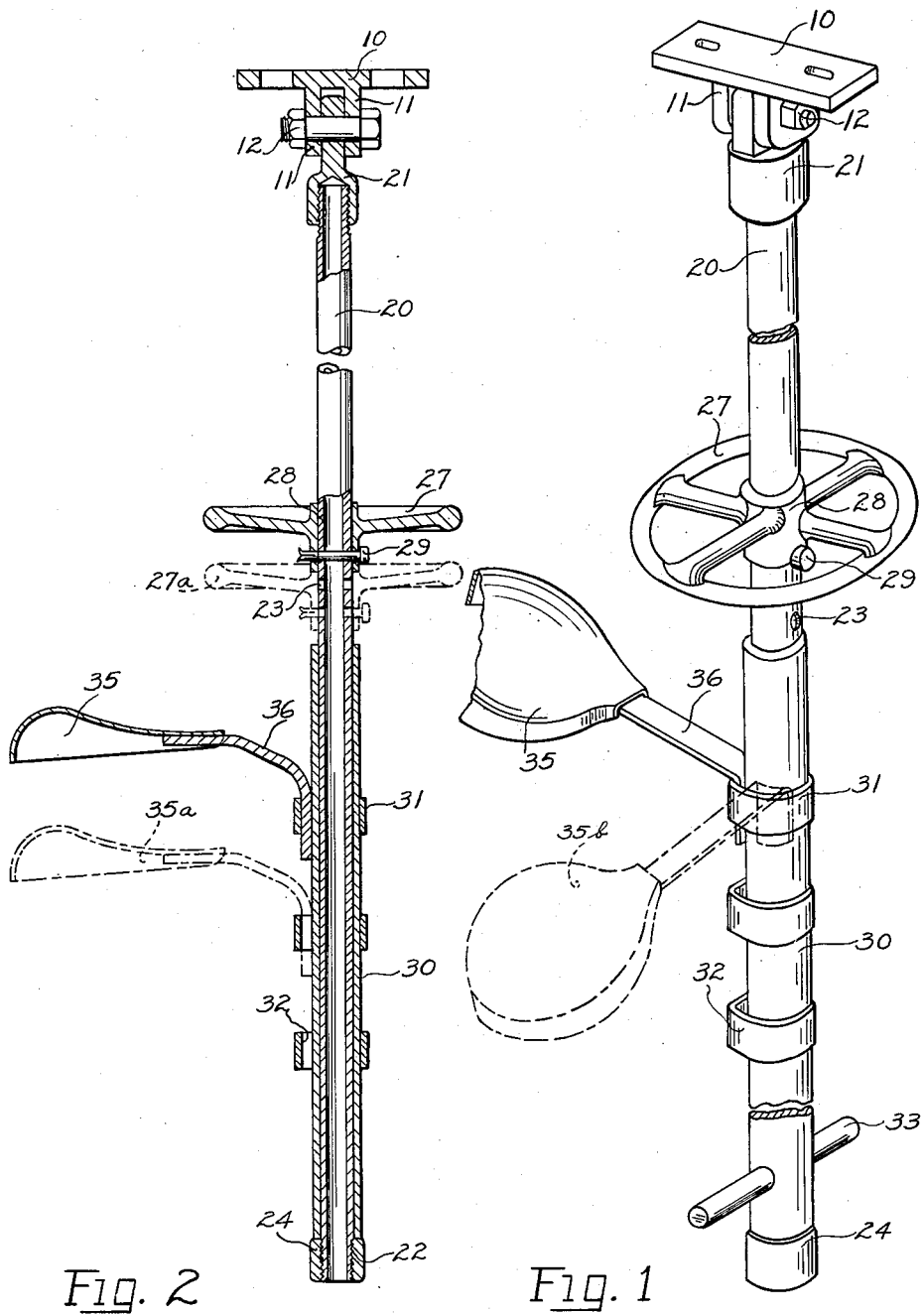

2,532,444

UNITED STATES PATENT OFFICE 2,532,444

PLAYGROUND SWING

Carmel Germana, Cleveland, Ohio

Application November 6, 1946, Serial No. 708,130

4 Claims. (Cl. 155—58)

This invention relates to swings and particularly to playground swings of the maneuverable type.

The primary object of this invention is to provide a child's swing which may be turned and thus be ridden in a forward direction at all times.

Another object of the invention is to provide a device of the type mentioned which is adjustable and may be made to fit children of various sizes and ages.

These and other objects of the invention will become apparent from a reading of the following description and claims together with the accompanying drawing wherein like parts are indicated and referred to by like reference characters and wherein:

Figure 1 is a perspective view of the swing; and

Figure 2 is a vertical cross sectional view thereof.

This invention consists broadly of three main elements; a pendulous shaft member including means for supporting it on a lateral support, a wheel member rigidly mounted on the shaft and a seat member rotatably mounted on the shaft. Each of these members will be described in detail and in the order set forth.

In the drawing the shaft member 20, which may be made of a piece of ordinary one inch iron pipe, is provided with a tongue and socket 21 at its top. The top end of the shaft 20 is threaded to engage the threaded socket of the tongue and socket 21. The lower end of the shaft member 20 is also threaded externally as indicated by the reference character 22. A cap 24 is threadedly mounted on the lower end of the shaft 20 so as to form a peripheral flange thereabout as is clearly shown in the drawing. About three or four feet above the cap 24 there are drilled a series of holes 23 which receive the hereinafter described wheel pin 29. These holes 23 are spaced apart so that the wheel member may be raised or lowered as desired to suit the particular needs of the rider.

In the drawing the character 10 indicates a supporting member which may be attached to any lateral upright rigid member. The reference character 11 indicates two parallel tongues or guides integral with and depending from the support 10. The guides are provided with aligned lateral holes to receive the pin 12 and which pin pivotally engages the aforementioned tongue 21. This suspension member consisting of the support 10, tongue 21, and pin 12 is so made that the shaft 20 will swing in one plane only and will not turn or rotate.

The wheel member or positioning means consists of the steering wheel 27 and separable pin 29. The wheel 27 is about 12 or 15 inches in diameter and is provided with a hub 28 as shown. The hub 28 slidably fits the shaft 20 and has a radial hole therein which receives the aforementioned pin 29. This wheel 27 may be raised or lowered as desired by simply removing the pin 29 and sliding the hub 28 up or down on the shaft 20. In the Figure 2 the reference character 27a indicates an alternate position of the wheel 27. When the pin 29 is fully inserted in the aligned holes in both the hub and the shaft, the wheel then is non-rotatable and is fixed in position.

The seat member consists of a tubular member 30 which may easily and freely rotate about the shaft 20. The bottom end of the tube 30 slides on the top edge of the cap 24 as shown. Securely fastened to the tube 30 is a collar 31 which on one side of the tube 30 forms a receptacle or pocket 32 for the hereinafter described saddle or seat member. This collar or bracket 31 may be securely welded or riveted to the tube 30. Again in order to provide for suitable adjustment of the device, several of these brackets 31 are mounted on the tube 30 so that the saddle 35 may be raised or lowered as desired.

The bottom end of the tube 30 is provided with a pair of aligned laterally extending foot rests 33.

The seat 35 is shaped and formed somewhat like a bicycle saddle and is provided with a forwardly extending supporting arm 36 which is bent so that the free end thereof may be inserted in a socket 32 of one of the brackets 31. This support 36 may be made of rather substantial spring steel and may be slightly resilient to be more comfortable.

In use the child sits on the seat 35 with its feet on the lateral bars 33 and grips the steering wheel 27. The seat member is rotatable and the wheel member is fixed, the child can, by firmly grasping the wheel, turn itself around the shaft 20 as desired. All the child need do when the shaft 20 reaches the end of its swing, is to twist itself around the shaft, and with a little practice it learns to time the oscillations of the swing, and becomes quite adept in using the device for pleasure and exercise. The child therefore, if it desires to do so, may face the direction of travel at all times. It may also swing sidewise at all times or it may ride the swing in a conventional manner by simply sitting still and swinging back and forth but facing in one direction of travel only.

Being adjustable the swing may be made to accommodate children of many ages. The shaft 20 may be of any suitable length and may be made to fit in an ordinary doorway of a home or it may be made long enough to be supported at a great height. The shaft also may be made of several short lengths of pipe suitably coupled together. The whole device may be easily dismantled and taken apart for easy storage and transportation.

Having thus disclosed the invention in its preferred form it should be understood that the invention as disclosed is illustrative only and is not to be construed in a limited sense as there may be other forms or modifications of the invention which also come within the scope of the appended claims.

I claim:

1. A swing, comprising in combination, a support member, a depending shaft pivotally mounted on the support member, the said shaft being non-rotatable and being swingable on one plane, the said shaft having a flange on its free lower end, a wheel fixedly mounted around the shaft between its upper and lower ends, and a tube rotatably mounted on the shaft between the wheel and flange, the said tube having an adjustable seat and foot rest thereon.

2. A swing, comprising in combination, a support member, a depending shaft mounted on the support member, the said shaft having a flange on its free lower end, a wheel fixedly mounted around the shaft between its upper and lower ends, and a tube rotatably mounted on the shaft between the wheel and flange, the said tube having an adjustable seat and foot rest thereon.

3. A swing, comprising in combination, a support member, a depending shaft mounted on the said support member, the said shaft having a flange on its free lower end, a handle mounted on the support member between its upper and lower ends, and a tube member rotatably mounted on the shaft and supported by the said flange, the said tube member having a seating means thereon.

4. A swing, comprising in combination, a support member, a depending shaft mounted on the support member, the said shaft having a lateral stop means on its free lower end, a hand grip mounted on the support member between its upper and lower ends, and a tube member rotatably mounted on the shaft and supported by the said stop means, the said tube member having a seating means thereon.

CARMEL GERMANA.

REFERENCES CITED

The following references are of record in the file of this patent:

UNITED STATES PATENTS

| Number | Name | Date |
|---|---|---|
| 737,398 | Grote | Aug. 25, 1903 |
| 921,441 | McPherson | May 11, 1909 |
| 1,886,904 | Rice | Nov. 8, 1932 |